United States Patent
Reiners

(10) Patent No.: US 7,085,433 B2
(45) Date of Patent: Aug. 1, 2006

(54) SYSTEM AND METHOD FOR PERFORMING ROTATIONAL AND TRANSLATIONAL TESTING FOR A REFERENCE IMAGE USED IN A NORMALIZED GRAY SCALE PATTERN FIND SYSTEM

(75) Inventor: Lawrence Lee Reiners, Apple Valley, MN (US)

(73) Assignee: Banner Engineering Corp., Minneapolis, MN (US)

( * ) Notice: Subject to any disclaimer, the term of this patent is extended or adjusted under 35 U.S.C. 154(b) by 794 days.

(21) Appl. No.: 10/337,518

(22) Filed: Jan. 6, 2003

(65) Prior Publication Data

US 2004/0131280 A1    Jul. 8, 2004

(51) Int. Cl.
*G06K 9/36* (2006.01)
(52) U.S. Cl. ............. 382/289; 382/151; 382/209
(58) Field of Classification Search ........ 382/141–154, 382/209, 289–292
See application file for complete search history.

(56) References Cited

U.S. PATENT DOCUMENTS

| | | | | |
|---|---|---|---|---|
| 5,453,840 A | * | 9/1995 | Parker et al. | 356/400 |
| 6,134,340 A | * | 10/2000 | Hsu et al. | 382/124 |
| 6,396,940 B1 | * | 5/2002 | Carrott et al. | 382/128 |
| 6,668,072 B1 | * | 12/2003 | Hribernig et al. | 382/124 |
| 2003/0179920 A1 | * | 9/2003 | Hooker et al. | 382/141 |

OTHER PUBLICATIONS

Hirooka et al., "Hierarchical distributed template matching", SPIE vol. 3029, Apr. 1997, pp. 176-183.*
Ballard, D. et al., Chapters 1 (Computer Vision), 2 (Image Formation), 4 (Boundary Detection), 6 (Texture) and 11 (Matching) from "Computer Vision," *Department of Computer Science, University of Rochester, Rochester, New York* (1982).
Glazer, F. et al., "Scene Matching by Hierarchical Correlation," *IEEE*, pp. 432-441 (1983).

* cited by examiner

*Primary Examiner*—Jingge Wu
*Assistant Examiner*—Yubin Hung
(74) *Attorney, Agent, or Firm*—Merchant & Gould P.C.

(57) ABSTRACT

A system, method, and corresponding computer data product, generates a high resolution reference image, generates a set of rotated reference images from the high resolution reference image, cross-correlates the set of rotated reference images with the high resolution reference image to generate a set of cross-correlation values, and determines that the high resolution reference image is suitable for use in a normalized gray scale pattern find process when the difference between any two correlation values generated by the image cross correlation module is greater than a predetermined threshold value.

21 Claims, 9 Drawing Sheets

SYSTEM AND METHOD FOR PERFORMING ROTATIONAL AND TRANSLATIONAL TESTING FOR A REFERENCE IMAGE USED IN A NORMALIZED GRAY SCALE PATTERN FIND SYSTEM

TECHNICAL FIELD

The present invention relates to data processing of images within a machine vision system, and more specifically to a system and method for performing rotational testing for a reference image used in a normalized gray scale pattern find system.

BACKGROUND

The use of machine based vision systems has always been a computationally intensive task as a large number of pixels need to be processed in order for the acquired image to be processed. This processing requirement arises from the need for high resolution images to be acquired to accurately represent the item represented in the image. The processing capabilities of embedded processing systems that are part of machine based vision systems have required the lowest possible image resolution images to be used.

Previous solutions have either used large and expensive processing systems if the vision systems are required to operate in near-real time or used an off-line processing approach that would not permit the determination of vision based decisions before the next item is examined by the vision system. Off-line systems are not useful in most applications as automating the visual inspection of items typically is desired for a large number of items, such as a sequence of items found on an assembly line.

Typically, an item being inspected will be rotated a random amount relative to the camera field of view (FOV) that is used when a reference image is generated. Because of this fact, the acquired image may not be positioned in a desired orientation relative to the reference image when a correlation or matching operation is to occur. The contents of the reference image may itself be rotated and the processing repeated. However, this rotation and subsequent processing may not be able to adequately discriminate between particular amounts of rotation. This result may depend upon the information content of the reference images. In prior systems, this effect of rotation upon the matching operation has not been considered. The present invention disclosed herein overcomes the above limitations of the prior art machine-based vision systems.

SUMMARY OF THE INVENTION

The present invention includes a method for performing rotational testing for a reference image used in a normalized gray scale pattern find system. In accordance with the invention, one embodiment includes a computer controlled system for performing rotational testing for a reference image used in a normalized gray scale pattern find system. The system includes a reference image data module for providing a high resolution reference image, a reference image rotation module for generating a set of rotated reference images based upon the high resolution reference image, an image cross correlation module for cross-correlating the set of rotated reference images with the high resolution reference image, and a reference image test and error module for determining the high resolution reference image may be successfully used in a normalized gray scale pattern find process.

Another embodiment of the present invention includes a computer controlled method for performing rotational testing for a reference image used in a normalized gray scale pattern find system. The method, and corresponding computer data product, generates a high resolution reference image, generates a set of rotated reference image from the high resolution reference image, cross-correlates the set of rotated reference images with the high resolution reference image to generate a set of cross-correlation values, and determines that the high resolution reference image is suitable for use in a normalized gray scale pattern find process when the difference between any two correlation values generated by the image cross correlation module is greater than a predetermined threshold value.

BRIEF DESCRIPTION OF THE DRAWINGS

In the drawings, wherein like reference letters and numerals indicate corresponding elements throughout the several views.

DETAILED DESCRIPTION

Figure 1:
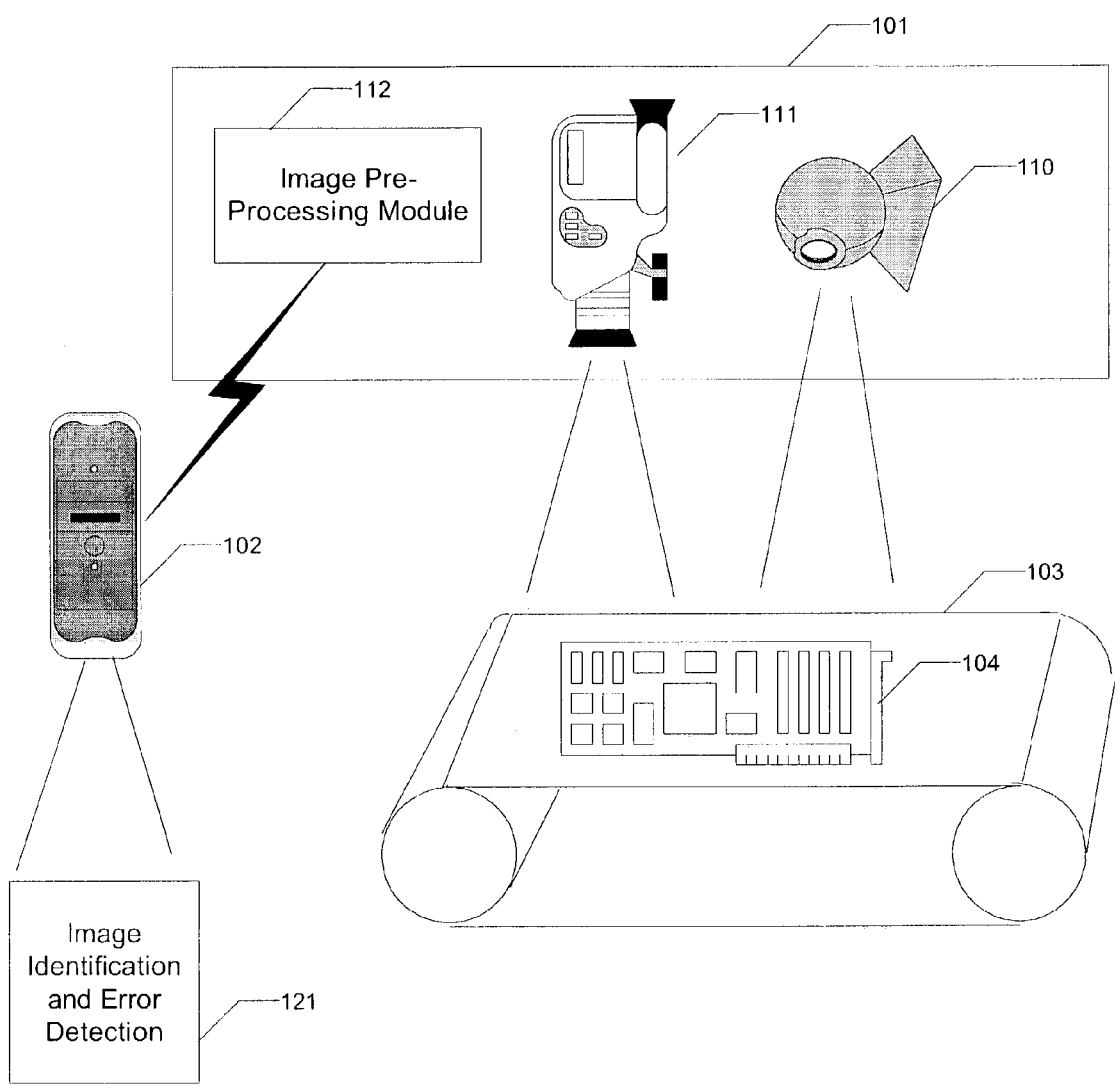
FIG. 1 illustrates a system for providing a machine vision system in accordance with the present invention.

The present invention relates to a system and method for data processing of images within a machine vision system, and more specifically to a system and method for performing rotational testing for a reference image used in a normalized gray scale pattern find system. FIG. 1 illustrates a system for providing a machine vision system in accordance with the present invention. The machine vision system includes a image input device, such as a video camera 111 or digital image camera 110, that are connected to a data processing system 102. The vision system is typically used to obtain images of objects of interest such as parts 104 that are being manufactured oil an assembly line 103. The image input device 111–110 obtains an image of the object of interest 104 that is first pre-processed 112 within an embedded processing system before being further processed within the computing system 102 as needed. The present invention related to the analysis of a reference image that occurs as part of the selection and creation of a reference image that is loaded into the image pre-processing module 112 before the vision system is used to examine the item of interest 104.

Figure 2A:
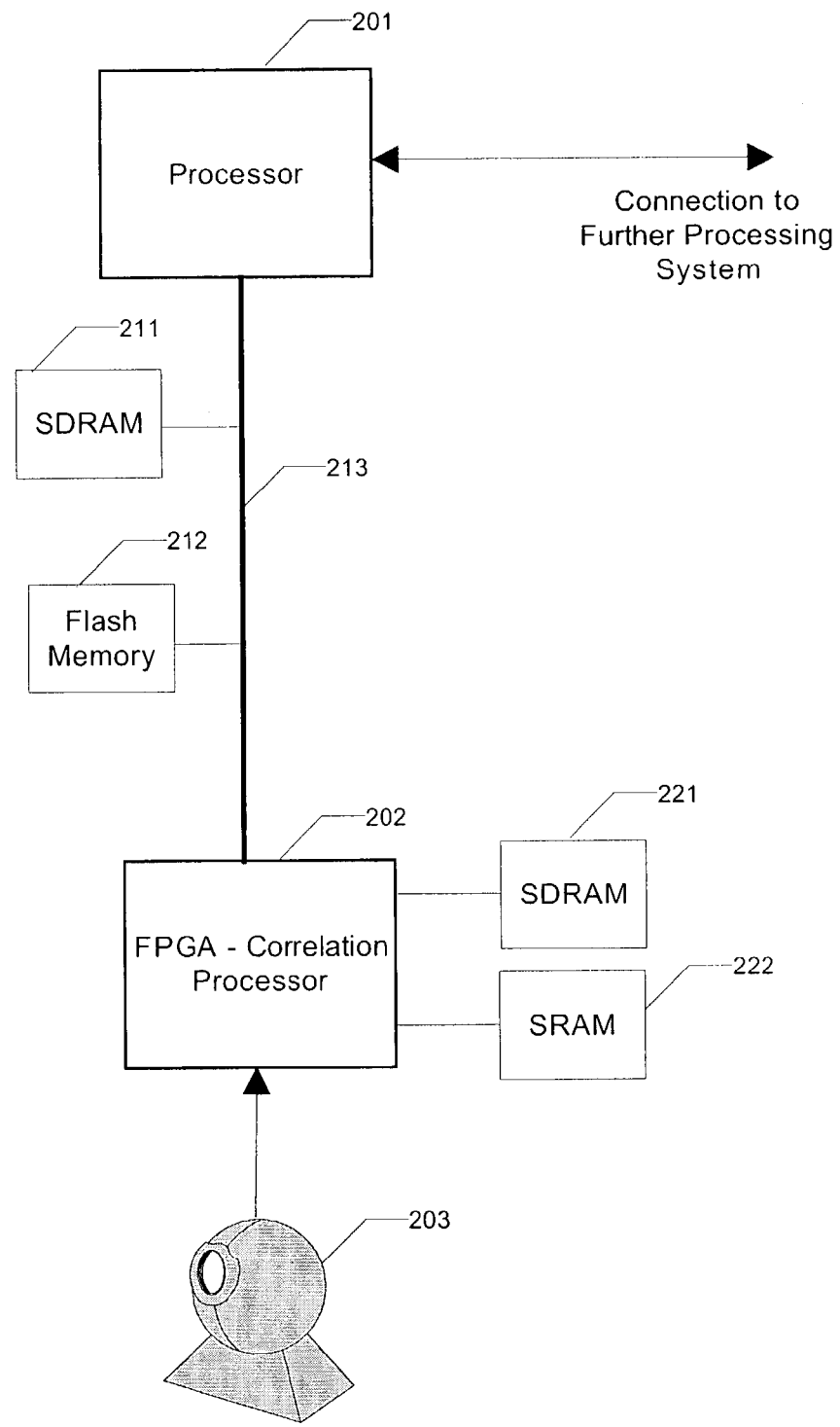
FIG. 2a illustrates an embodiment of a special purpose computing system for providing a machine vision system in accordance with the present invention.

FIG. 2a illustrates an embodiment of a special purpose computing system for providing a machine vision system in accordance with the present invention. Typically, a special purpose computing system is used to perform the pre-processing of acquired images that are to be scanned to compare the acquired image with a previously generated and stored image of the item of interest. An example of a vision system that would utilize such a pre-processing system may be found within a commonly assigned and concurrently filed U.S. Patent Application, titled, "SYSTEM AND METHOD FOR USING NORMALIZED GRAY SCALE PATTERN FIND", Ser. No. 10/340,168, filed Jan. 9, 2003. This application is hereby incorporated by reference as if recited in its entirety herein.

The special purpose computing system includes a main processor 201, a correlation processor 202, and memory 211–212 which all communicate over a system bus 213. The memory may consist of RAM of different types including synchronous dynamic RAM (SDRAM) 211 and mass storage that may consist of flash memory 212. Of course, one skilled in the art will recognize that various memory architectures may be utilized to construct the present invention as recited within the attached claims.

Figure 2B:
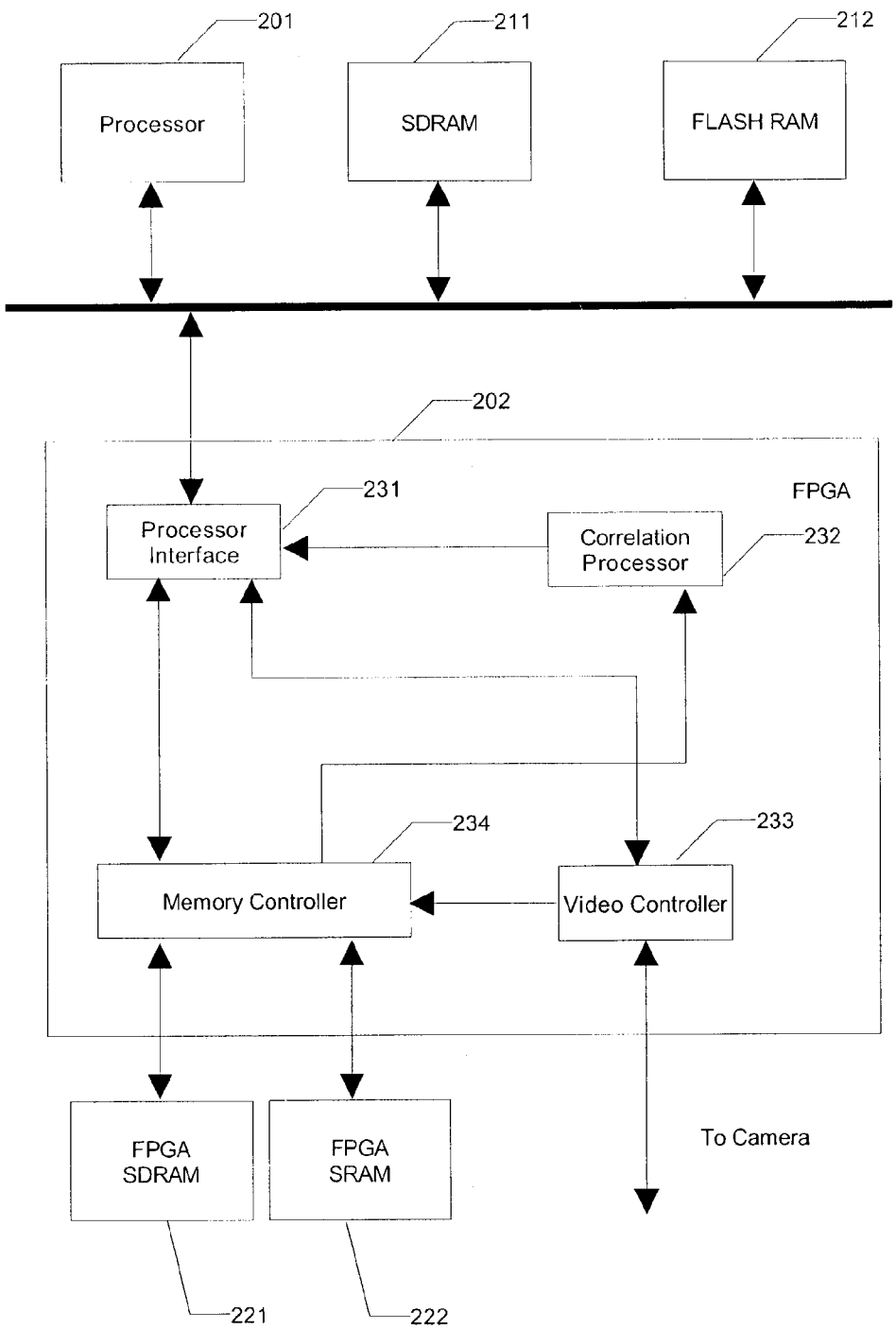
FIG. 2b illustrates an embodiment of a special purpose computing system for providing a FPGA implemented machine vision system in accordance with the present invention.

The correlation processor possesses its own memory system which may include synchronous dynamic RAM (SDRAM) 221 and SRAM 222 to store the data needed for the correlation processing that is part of the pre-processing subsystem. The correlation processor is also electrically connected to an image generation device 203, such as a digital camera. The correlation processor may be constructed from a custom electronic device made using a Field Programmable Gate Array (FPGA). An example of such a FPGA is shown in FIG. 2b.

During the operation of the pre-processing subsystem, an acquired image is generated by the camera 203 and passed into the correlation processor 202. This processor 202 may store part or all of the acquired image into its memory 221–222 for use in its processing. As is discussed later in more detail in relation to FIG. 4, the correlation processor will correlate a small reference image with the larger acquired image in an attempt to locate where within the larger image the reference image is located. This computationally intensive process occurs within the correlation processor 202. As is also discussed in reference to FIG. 6, the resolution of the acquired image and the reference image may be varied to minimize the processing needed during the pre-processing operations.

The correlation processor 202 receives the reference image from the main processor 201 and passes the results of the correlation process to the main processor 201 for additional processing. The main processor 201 also instructs the correlation processor 202 where in the acquired image the correlation operation is to occur. The main processor 201 receives the generated correlation image that may be searched for a peak value that corresponds to the location where the best match between the reference image and the processed portion of the acquired image. The main processor 201 may also instruct the correlation processor 202 to use a lower resolution image to speed up the processing. In such a case, the acquired image must be reduced in resolution either by averaging pixel values to create a lower resolution acquired image or by sub-sampling the acquired image to create the lower resolution acquired image. In either case, a reference image having the same spatial resolution as the acquired resolution is needed before the correlation operation occurs.

The main processor 201 may instruct the correlation processor to correlate the acquired image against a series of references where each of the references possess a different spatial resolution. In such a case, the entire acquired image may be correlated using the lowest resolution image for the reference image to find one or more possible match locations. Once these possible match locations are found, smaller regions of the acquired image may be correlated using higher resolution reference images. In such an arrangement, the vast majority of the acquired image will be processed at the lowest resolution, thus requiring the minimum amount of processing to occur. The highest resolution references may be used only over small areas where there is high confidence that the match is going to occur. As such, a processing system may be constructed that uses high resolution references to determine the final match location without the need to process the acquired image at the highest resolution.

The interaction between the main processor 201 and the correlation processor 202 occurs in this manner until the best match location is determined. The best match location and the acquired image may then be passed to a general processing system for further processing as needed. In many vision systems, the task of the pre-processing system is to determine the location of a known reference region in a larger image. Once the location, orientation, and scale of the reference is obtained, then further processing may occur. For example, a reference mark may be placed on a printed circuit board to be processed by a vision system as it passes on an assembly line. The vision system acquires an image of a printed circuit board as it passes through the vision system's field of vision. If the vision system can locate the reference mark in the acquired image, the vision system may then look for other components at known locations relative to the reference mark within the acquired image. Using a reference mark to register the item being scanned within the acquired image will greatly simplify the vision processing and inspection processing to occur. FIG. 2b illustrates an embodiment of a special purpose computing system for providing a FPGA implemented machine vision system in accordance with the present invention. This example embodiment illustrates the modules within the FPGA correlation processor 202 within a processing system if FIG. 2b. The FPGA correlation processor 202 includes a processor interface module 231, a correlation processor 232, a memory controller module 233 and a video controller 234.

The processor interface module 231 handles both command and data transfers between the processor 201 and the other blocks of the FPGA 202. The video controller module 234 handles image transfers from the camera to memory controller module 233. When the processor 201 instructs the FPGA 202 to capture an image the FPGA 202 waits for a valid frame from the camera and then begins transferring image data to the memory controller 233 for each valid line.

The memory controller module 233 handles transfers from the FPGA SRAM 222 to the processor 201. This operation allows the image to be displayed for a user. The memory controller module 233 also handles transfers from the correlation processor module 232 for normalized grayscale correlation.

The memory controller module 233 handles transfers to the FPGA SDRAM 221 from the video controller module 234. This operation allows the storage of the image from the camera. The memory controller module 233 also handles transfer to the FPGA SDRAM 221. This operation allows double buffered images to be moved for processing.

The memory controller module 233 handles transfers from the FPGA SDRAM 221 to the processor 201 and the correlation processor module 232 for normalized grayscale con-elation.

The memory controller module 233 handles transfers to the FPGA SDRAM 221 from the video controller module 234. This operation allows the storage of a double buffered image from the camera. The memory controller module handles transfers to the processor 201 to allow the storage of the reference pattern image along with all the rotated and decimated reference pattern images.

Prior to capturing an image from the camera the processor 201 instructs the memory controller module 233 to store the image in either just FPGA SRAM 222 or also the FPGA SDRAM memory 221. The processor 201 also provides the memory controller module 233 with starting pointers for the image buffers. During an image transfer from the camera the memory controller module 233 accepts video data from the video controller module 234 and stores it in the specified memory buffer(s).

Prior to starting the correlation process the processor 201 provides the memory controller module 233 with pointers to the location of the appropriate reference pattern in the FPGA SDRAM memory 221 and the current image in the FPGA SRAM 222.

The correlation processor module 232 consists of both multipliers and adders allowing for hardware assist in the calculation of the various terms for the normalized grayscale correlation equation (NGC). The NGC equation is:

$R = \text{Numerator/Denominator}$ where

Numerator $= (N*\Sigma(I*R)) - (\Sigma I * \Sigma R)$
Denominator $= \{(N*\Sigma I^2 - (\Sigma I)^2)*(N*\Sigma R^2 - (\Sigma R)^2)\}^{1/2}$
N = number of pixels in reference template
I = inspection image
R = reference pattern The correlation processor calculates 3 terms for the NGC equation:
$\Sigma(I*R)$
$\Sigma I^2$ and
$\Sigma I$ Prior to running an inspection the processor calculates the 2 reference pattern items:
$\Sigma R$ and
$N*\Sigma R^2 - (\Sigma R)^2$ The processor 201 provides the memory controller module 233 with pointers to the start of the appropriate reference pattern and the location in the search ROI to perform the correlation. The memory interface to both the FPGA SDRAM 221 and SRAM 222 is 16-bits wide and each image grayscale value is only 8-bits wide. The image is stored in the FPGA SRAM memory 222 so that each image row starts on an even 16-bit word boundary. The processor also stores the various reference patterns in the SDRAM 221 so that they are aligned on 16-bit boundaries. This allows the correlation processor to simultaneously calculate the 3 terms for two adjacent NGC correlation values. At the completion of the correlation process the correlation processor provides the processor with 6 terms, 3 for the even NGC value and 3 for the odd NGC value.

Figure 3:
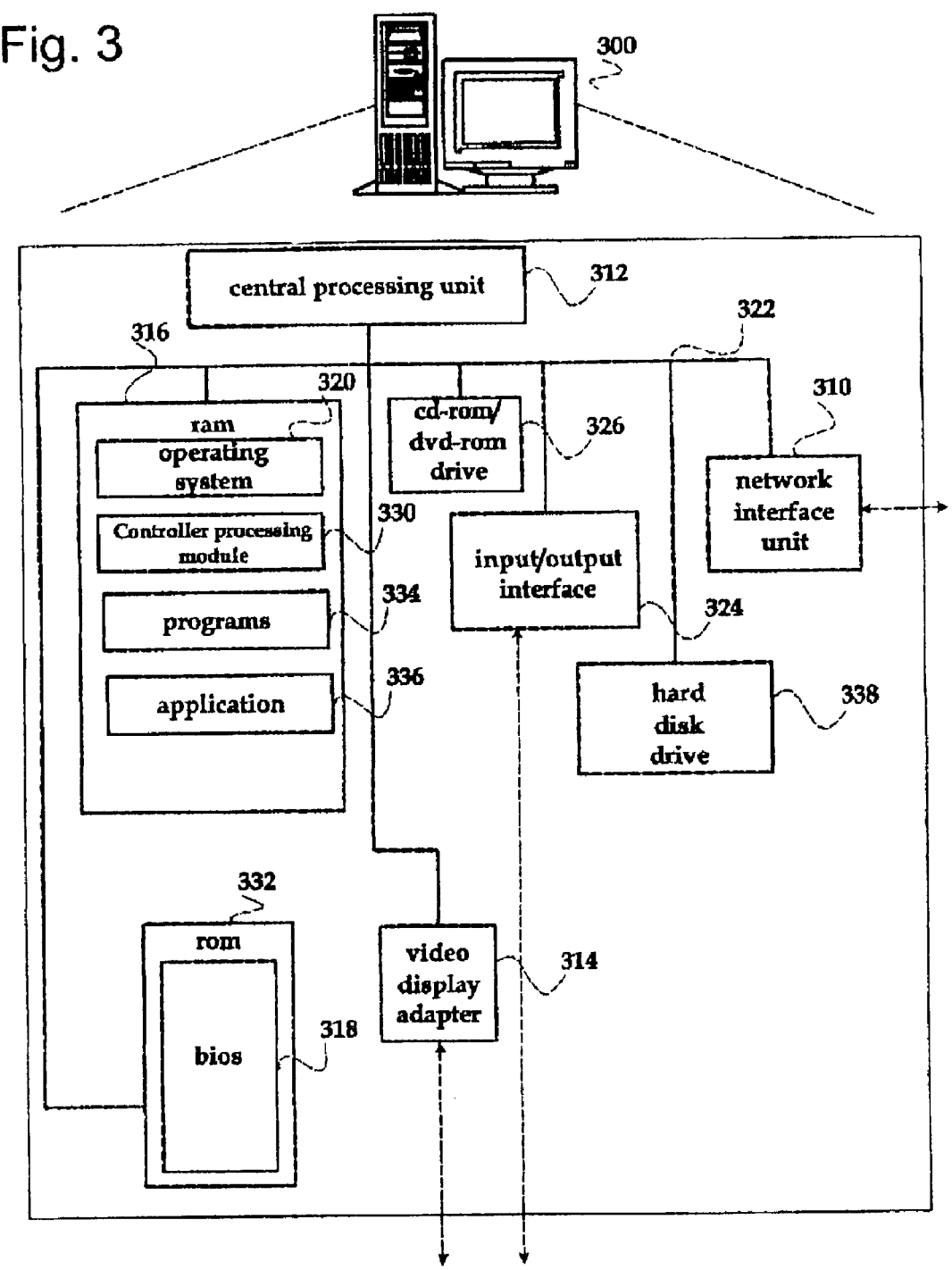
FIG. 3 illustrates an embodiment of computing systems used as part of a system providing a machine vision system in accordance with the present invention.

FIG. 3 illustrates an embodiment of a general purpose computing systems used as part of a system for configuring an optical circuit in accordance with the invention. As shown in FIG. 3, the master controller processing system 300 is connected to a WAN/LAN 100, or other communications network, via network interface unit 310. Those of ordinary skill in the art will appreciate that network interface unit 310 includes the necessary circuitry for connecting a processing system to WAN/LAN 200, and is constructed for use with various communication protocols including the TCP/IP protocol. Typically, network interface unit 310 is a card contained within the processing system 300.

The processing system 300 also includes processing unit 312, video display adapter 314, and a mass memory, all connected via bus 322. The mass memory generally includes RAM 316, ROM 332, and one or more permanent mass storage devices, such as hard disk drive 328, a tape drive, CD-ROM/DVD-ROM drive 326, and/or a floppy disk drive. The mass memory stores operating system 320 for controlling the operation of master controller processing system 300. It will be appreciated that this component may comprise a general purpose server operating system as is known to those of ordinary skill in the art, such as UNIX, LINUX™, MAC OS®, or Microsoft WINDOWS NT®. Basic input/output system ("BIOS") 318 is also provided for controlling the low-level operation of master controller processing system 300.

The mass memory as described above illustrates another type of computer-readable media, namely computer storage media. Computer storage media may include volatile and nonvolatile, removable and non-removable media implemented in any method or technology for storage of information, such as computer readable instructions, data structures, program modules or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data for providing a master controller processing and network development. More specifically, the mass memory stores applications including master controller processing module 330, programs 334, and other applications 336. Processing module 330 includes computer executable instructions which, when executed by master controller processing system 300, performs the logic described above.

The processing system 300 also comprises input/output interface 324 for communicating with external devices, such as a mouse, keyboard, scanner, or other input devices not shown in FIG. 3. Likewise, master controller processing system 300 may further comprise additional mass storage facilities such as CD-ROM/DVD-ROM drive 326 and hard disk drive 328. Hard disk drive 328 is utilized by master controller processing system 300 to store, among other things, application programs, databases, and program data used by master controller processing module 330. For example, customer databases, product databases, image databases, and relational databases may be stored. The operation and implementation of these databases is well known to those skilled in the art.

One skilled in the art may readily recognize that a processing system 300 may possess only a subset of the components described above without deviating from the spirit and scope of the present invention as recited within the attached claims. For example, in one embodiment, the mass storage devices for the master controller processing system 300 may be eliminated with all of the data storage being provided by solid state memory. Programming modules may be stored in ROM or EEPROM memory for more permanent storage where the programming modules consist of firmware that is loaded or updated infrequently. Similarly, as an embedded processing system, many of the user interface devices such as input devices and display devices may also not be present.

Figure 4:
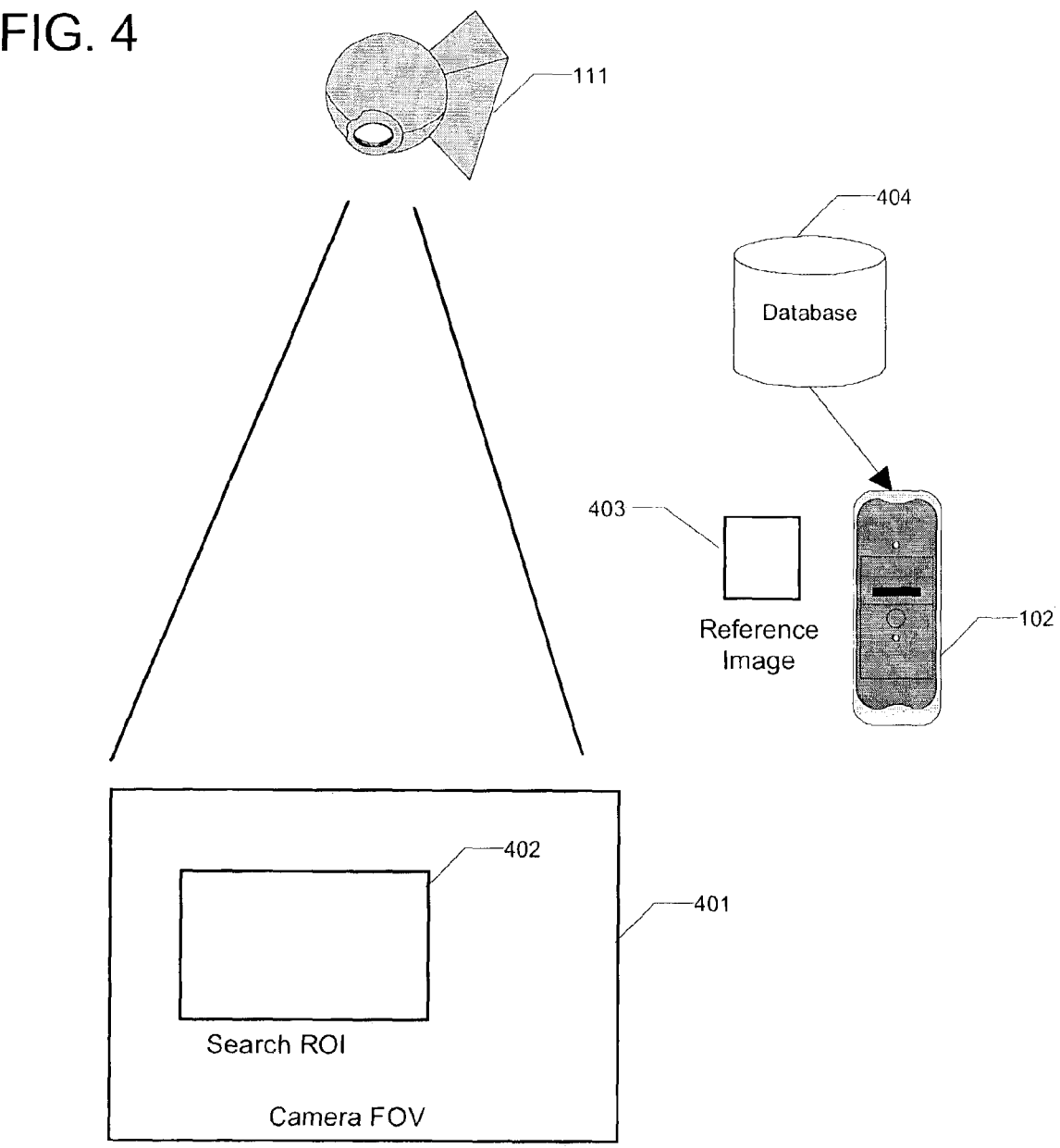
FIG. 4 illustrates an example machine vision system attempting to locate a reference image within an image from a camera field of view in accordance with an embodiment of the present invention.

FIG. 4 illustrates an example machine vision system attempting to locate a reference image within an image from a camera field of view (FOV) in accordance with an embodiment of the present invention. As discussed above, an acquired image 401 is typically much larger than the reference image 403 that is to be located within the acquired image 401. As is also discussed above, the processing system may wish to restrict the search region of interest (ROI) to be an area at a known location which is of interest. When beginning to examine the acquired image 401, the search ROI 402 may correspond to the entire acquired image 401. Once information is determined to limit the search ROI 402 to a smaller area, less processing is needed to perform a correlation or matching operation.

Typically, the reference image 403 is generated well before the acquired image is obtained. The reference image 403 represents an image that is expected to be found within the acquired image 401. The task of the vision system is to find where within the acquired image 401 the reference image is located, and to identify any orientation information that is needed to define the location of objects whose position is know relative to the reference image.

Figure 5:
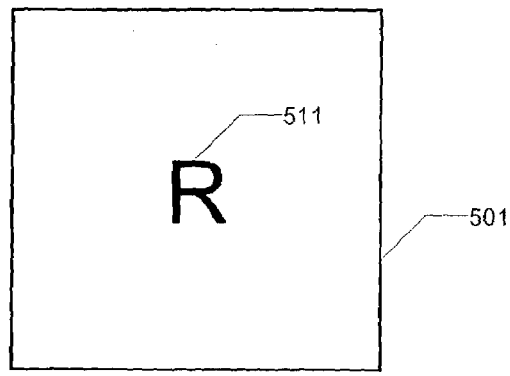
FIG. 5 illustrates a series of possible reference image arrangements when found in the camera image in accordance with the present invention.
Figure 5:
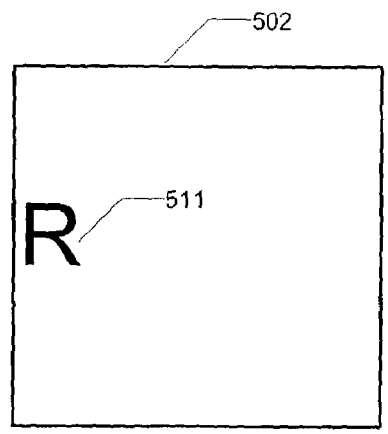
Figure 5:
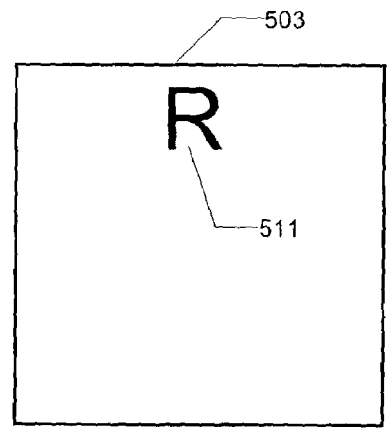
Figure 5:
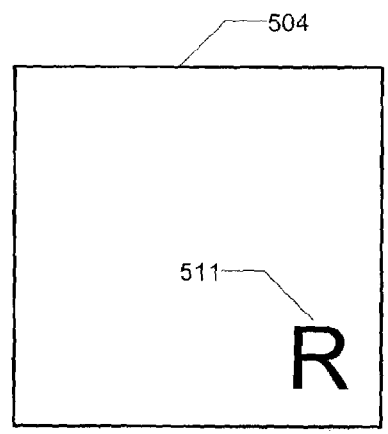
Figure 5:
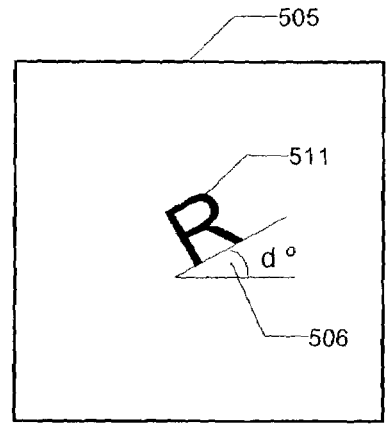

FIG. 5 illustrates a series of possible reference image arrangements when found in the acquired image in accordance with the present invention. In this example, consider a reference item 511, which corresponds in this example to a letter "R", to be located within five (5) different search ROIs of an acquired image. In an ideal case, the reference image would appear perfectly centered within the search ROI as shown in ROI 501. The reference R 511 is located at the center position and is oriented parallel to each of the sides of the ROI 501.

More typically, the reference item R 511 is usually displaced in either the x-direction as shown in ROI 502, the y-direction as shown in ROI 503, or both the x-direction and y-direction as shown in ROI 504. These positional offsets arise from the fact that the acquired image does not always know the exact location of an object that passes within the camera FOV. In an even more complicated situation that arises with regularity, a reference item 511 may be rotated a number of degrees (d°) relative to the expected orientation 506 in addition to the positional translation discussed above. The correlation operation must take all of these examples into account when attempting to locate a reference item 511 within a search FOV 501–505.

Figure 6:
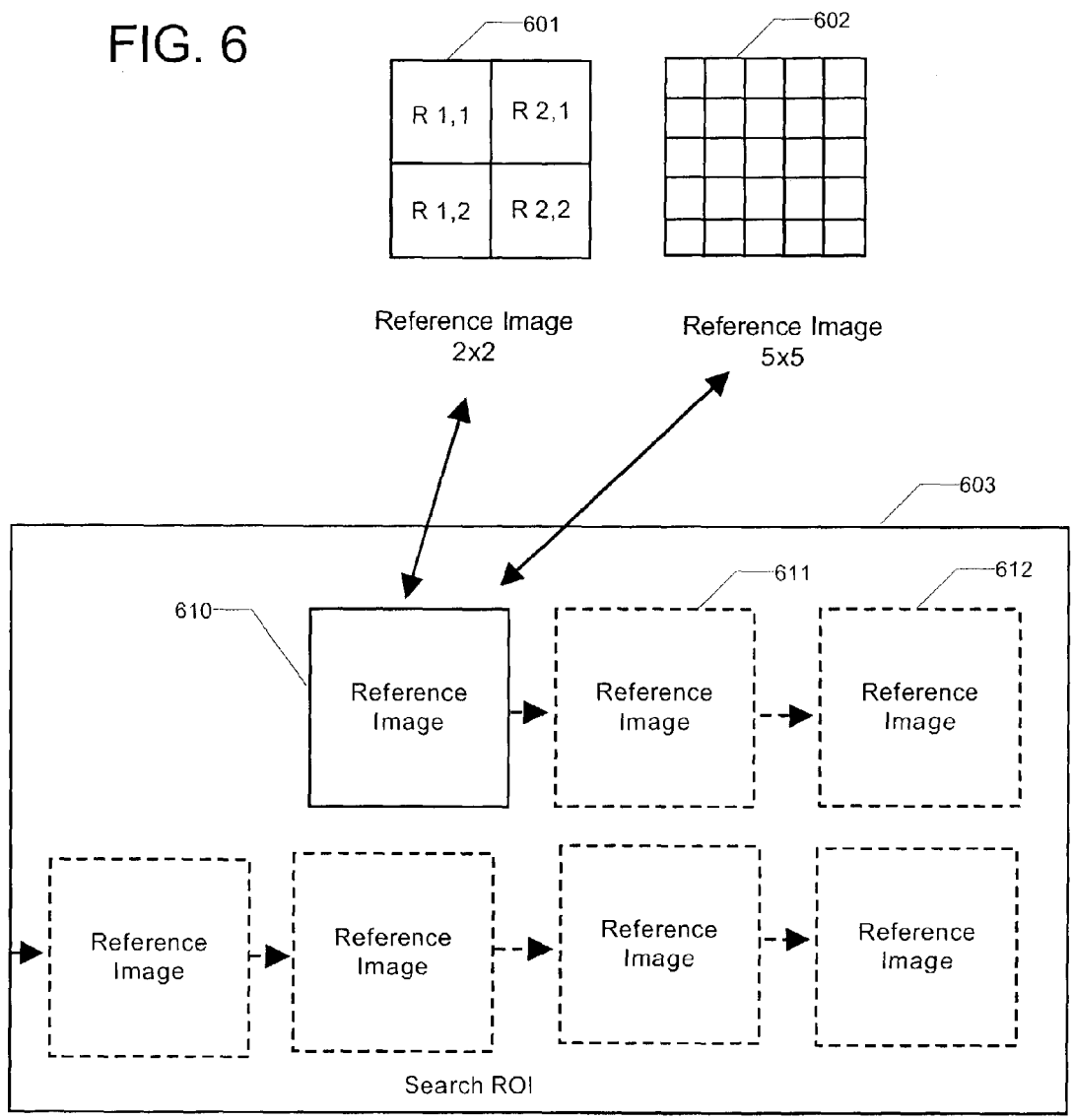
FIG. 6 illustrates a correlation of a reference image with a larger image at various decimation levels in accordance with an example embodiment of the present invention.

FIG. 6 illustrates a correlation of a reference image with a larger image at various decimation levels in accordance with an example embodiment of the present invention. The correlation operation that is to be performed as part of the above matching operation requires that the pixel values of the reference image 601–602 be correlated with corresponding pixels in a search ROI 603 for each possible location of the reference image 601–602 within the search ROI 603. At each possible location within the search ROI 603, the correlation value at that location is defined as:

$$r = \text{Numerator/Denominator}$$

where
Numerator$=(N*\Sigma(I*R))-(\Sigma I*\Sigma R)$
Denominator$=\{(N*\Sigma I^2-(\Sigma I)^2)*(N*\Sigma R^2-(\Sigma R)^2)\}^{1/2}$
N=number of pixels in reference template
I=inspection image
R=reference template From the above formula it is easily seen that calculating a single correlation value requires numerous multiplications, additions, subtractions, divides, and square-roots. This needs to be repeated as the template is slid around the entire search ROI. The number of correlation results is (m2−m1+1)*(n2−n1+1) where the search ROI is m2×n2 and the object ROI is m1×n1. As an example assume that the m2=250, n2=200(250×200), m1=100, and n1=100 (100×100) then the total number of correlation values is 15251. This operation requires:

305,106,257 multiples;
457,550,000 adds;
45,753 subtracts;
15,251 divides; and
15,251 square-roots.

Clearly, as the resolution required to represent the reference image increases, the amount of computations needed increases significantly. Because of this fact and because the above value is calculated for each possible location 610–612 of the reference image within the search ROI, a need exists to keep the search ROI as small as possible as the resolution of the reference image increases. The example embodiment shown in FIG. 6 illustrates reference images having a 2×2 and a 5×5 resolution. In the preferred embodiment, the references images may also include m×n sized reference images where the dimensions of the images are $10 \leq m \leq 20$ and $10 \leq n \leq 20$. The example discussed above applies to all resolutions of the reference image without deviating from the spirit and scope of the present invention as recited within the attached claims.

One solution to attempt to minimize the total amount of processing required when performing the above correlation operations is to correlate a reference image that uses a low resolution 601 against an a larger search ROT to find locations where possible matches occur. Once these locations are found, reference images that correspond to the reference item at higher resolutions may be correlated over a much smaller search ROT centered about the previously found match location. Presumably the match location will remain within the much smaller ROJ when the higher resolution reference image is used. Depending upon the range of resolutions used, the above find a best match location within an increasingly smaller search ROI may be found as the search process narrows in upon the best match location.

The present invention attempts to define when a reference image is acceptable for use in the Normalized Gray Scale Pattern Find Process described above. As discussed above, a desire exists to use as small a resolution as possible for the initial reference image in order to minimize the initial processing that is to occur over the entire acquired image. Unfortunately, the information content found within the item in the reference image may not permit a particularly small reference image to be used. In addition to the size of a decimated reference image that may be used in the above processing, the effects of image rotation for expected ranges of rotation for the reference item found in the reference image must be considered. A process is needed to determine if a reference image may be successfully used in the above processing when the content of the reference image has been rotated because an item of interest is viewed by the vision system at an angle of rotation to the camera FOV.

Figure 7:
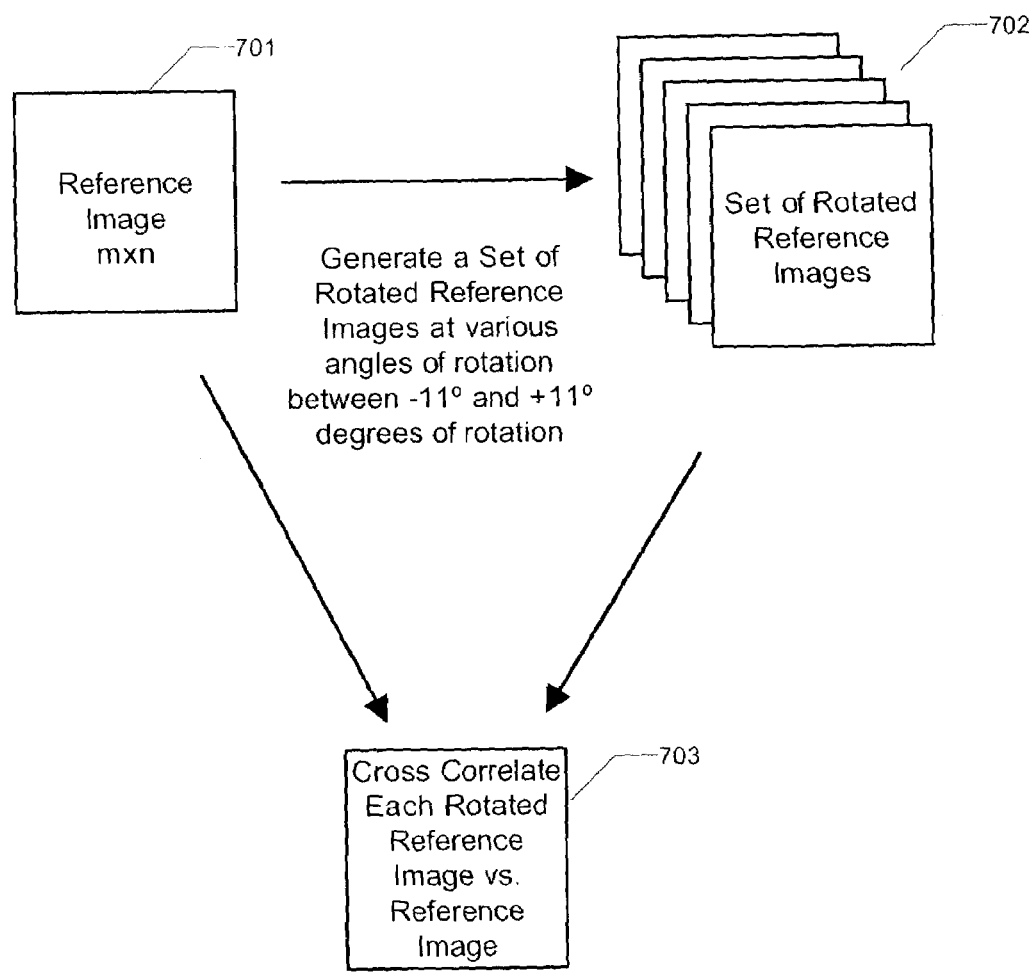
FIG. 7 illustrates a processing sequence of images to a reference image may be successfully used in the above processing when the content of the reference image has been rotated because an item of interest is viewed by the vision system at an angle of rotation to the camera FOV in accordance with an embodiment of the present invention.

FIG. 7 illustrates a processing sequence of images to a reference image may be successfully used in the above processing when the content of the reference image has been rotated because an item of interest is viewed by the vision system at an angle of rotation to the camera FOV in accordance with an embodiment of the present invention. The processing begins with the acquisition of a high resolution reference image 701. This image 701 is obtained using an image acquisition device such as a digital camera that has been optically zoomed to provide a desired spatial resolution for each pixel. From the acquired image, the area of the acquired image that contains the reference item is selected. This sub-image becomes the base reference image 701 that is used for all further processing.

Next, the high resolution reference image 701 is rotated by 1° increments in each direction repeatedly until a set of rotated reference images 702 is generated having an amount of rotation between +/−11°. This set of rotated images 702 is used to approximate an acquired image of an item of interest that is found within the camera FOV having an amount of rotation relative to the acquired image. One skilled in the art will recognize that the range of amount of rotation may not necessarily be limited to +/−11° and in the increments of rotation considered may be more or less than the 1° increments discussed above without deviating from the spirit and scope of the present invention as recited within the attached claims.

The set of rotated reference images 702 is then cross correlated with the high resolution reference image 701 to generate a set of correlation values corresponding to the set of rotated reference images 702. One would expect the set of correlation values to be a maximum when the angle of rotation is small and to drop towards a minimum value as the angle of rotation increases. The process of evaluating a reference image continues by determining whether the maximum NGC value of each rotated reference image cross correlated with the high resolution reference image is less than the value specified below in Table 1.

TABLE 1

NGC Threshold Value

| Angle of Rotation | Maximum NGC Value |
|---|---|
| +1.1 & −0.9 | 0.995 |
| +2.1 & −1.9 | 0.98 |
| +3.1 & −2.9 | 0.96 |
| +4.1 & −3.9 | 0.92 |
| +5.1 & −4.9 | 0.84 |
| +6.1 & −5.9 | 0.80 |
| +7.1 & −6.9 | 0.75 |
| +8.1 & −7.9 | 0.70 |
| +9.1 & −8.9 | 0.65 |
| +10.1 & −9.9 | 0.60 |

If the NGC value between any rotated reference image and the high resolution reference image is too large, the reference image is determined to contain information content that does not support an adequate resolution in the correlation values such that the Normalized Gray Scale Pattern Find Process may not be able to distinguish between acquired images at different degrees of rotation. This predetermined maximum value for each cross correlation has been found by experimentation to be the values above in Table 1 in a preferred embodiment of the present invention.

The processing system according to the present invention would inform a user that the selected reference image either passes or fails the rotational test. When the test determines that a particular reference image does not permit adequate discrimination of images at different degrees of rotation, a different reference image and/or a different reference mark within a reference image may need to be acquired for use in the Normalized Gray Scale Pattern Find Process described above. Other possible tests that may be included to determine the suitability of a reference image may include a determination of the percentage of saturated pixels found within the original high resolution reference image. If the percentage of saturated pixels is too high, information content that may be useful in the correlation process may be lost. Once again a different reference image and/or a different reference mark within a reference image may need to be acquired for use in the Normalized Gray Scale Pattern Find Process described above.

In addition, the above process may be repeated using an auto correlation of the full resolution reference image with a translated reference image to check the reference image for an acceptable amount of translational frequency content. In this test, the reference image is translated 1 and 2 pixels in each direction to generate a set of translated reference images. This set of translated reference images is cross correlated with the full resolution reference image. The reference image is considered to lack sufficient translational frequency content if there is less than a 20 percent difference between the top 2 correlation values generated in this process.

The above described process assumes that the reference image is processed without regard to an amount of reference image decimation that may be utilized within a Normalized Gray Scale Pattern Find Process. An example of a system that utilizes reference image decimation within a Normalized Gray Scale Pattern Find Process may be found within a commonly assigned and concurrently filed U.S. patent application, titled, "SYSTEM AND METHOD FOR DETERMINING A IMAGE DECIMATION RANGE FOR USE IN A MACHINE VISION SYSTEM", Ser. No. 10/337,525, filed Jan. 6, 2003. This application is hereby incorporated by reference as if recited in its entirety herein. One-skilled in the art will recognize that the high resolution reference image may be decimated by a predetermined amount before being rotated in either direction by a predetermined amount in discrete steps of rotation. In such a case, the decimated high resolution reference image is processed as if it were an input high resolution image and the same test for successful cross-correlation may be used. Such a modification would not necessarily deviate from the spirit and scope of the present invention as recited within the attached claims.

Figure 8:
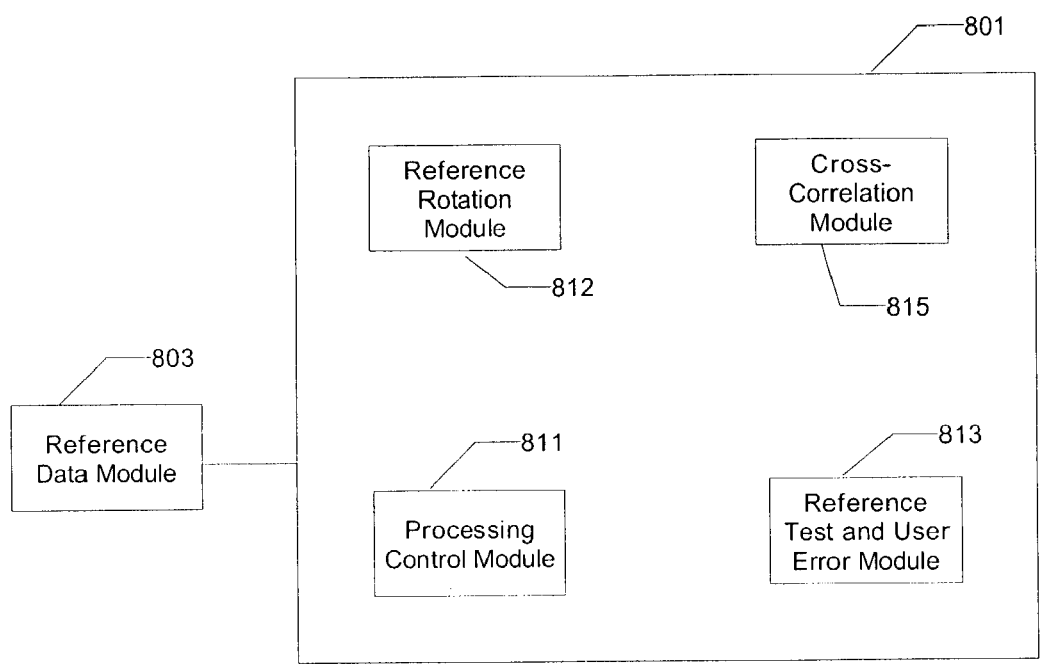
FIG. 8 illustrates a set of processing modules used within an example embodiment of a machine vision system in accordance with the present invention.

FIG. 8 illustrates a set of processing modules used within an example embodiment of a machine vision system in accordance with the present invention. The vision system according to the present invention is used to generated the reference image for use in a Normalized Gray Scale Pattern Find Process described above. The processing system 801 includes a processing control module 811, a reference image rotation module 812, a reference image test and user error module 813, and an image cross-correlation module 815. The processing module 801 is connected to a reference image data module 803.

The reference image data module 803 is used to acquire the reference image at its highest resolution and to select the area around the reference item that forms the high resolution reference image. The high resolution reference image is provided by the reference image data module 803 to the processing module 801 for use in its processing modules.

Within the processing module 801, the processing control module 811 receives user input commands to begin the processing of a reference image. This module 811 coordinates the operation of the other modules within the processing module 801 during their operation. The results of the processing, which may be in the form of the decimated reference images, or merely the decimation range values, may be passed by the processing control module 811 to other processing systems for use in a Normalized Gray Scale Pattern Find Process described above.

The reference image rotation module 812 processes the high resolution reference image to generate a set of high resolution rotated reference images that are to be cross-correlated against the original high resolution reference image. These rotated images are generated within a range of degrees of rotation and discrete increments of rotation. The image cross-correlation module 815 correlates the set of high resolution rotated reference images with the original high resolution reference image to determine if the reference image may be successfully used in the Normalized Gray Scale Pattern Find Process as described above.

The reference image test and error module 813 determines whether the reference image may be successfully used in the Normalized Gray Scale Pattern Find Process as described above using the results of the processing from the image cross-correlation module 815. This module may also determine if the reference image is suitable for use as a reference image by calculating the percentage of saturated pixels within the high resolution reference image.

The embodiments described herein are implemented as logical operations performed by a computer. The logical operations of these various embodiments of the present invention are implemented (1) as a sequence of computer implemented steps or program modules running on a computing system and/or (2) as interconnected machine modules or hardware logic within the computing system. The implementation is a matter of choice dependent on the performance requirements of the computing system implementing the invention. Accordingly, the logical operations making up the embodiments of the invention described herein can be variously referred to as operations, steps, or modules.

While the above embodiments of the present invention describe performing rotational testing for a reference image used in a normalized gray scale pattern find system, one skilled in the art will recognize that the use of the processing system discussed above are merely example embodiments of the present invention. As long as an image processing system is used to determine acceptable reference images consistent with the rotational processing disclosed herein, the present invention to would be useable in other data processing systems. It is to be understood that other embodiments may be utilized and operational changes may be made without departing from the scope of the present invention as recited in the attached claims.

As such, the foregoing description of the exemplary embodiments of the invention has been presented for the purposes of illustration and description. They are not intended to be exhaustive or to limit the invention to the precise forms disclosed. Many modifications and variations are possible in light of the above teaching. It is intended that the scope of the invention be limited not with this detailed description, but rather by the claims appended hereto. The present invention is presently embodied as a method, apparatus, and a computer data product containing a computer program for performing rotational testing for a reference image used in a normalized gray scale pattern find system. Since many embodiments of the invention can be made without departing from the spirit and scope of the invention, the invention resides in the claims hereinafter appended.

What is claimed is:

1. A system for performing rotational testing for a reference image used in a normalized gray scale pattern find system, the system comprising:
   a reference image data module for providing a high resolution reference image;
   a reference image rotation module for generating a set of rotated reference images based upon the high resolution reference image;
   an image cross correlation module for cross-correlating the set of rotated reference images with the high resolution reference image; and
   a reference image test and error module for determining, using the cross-correlating results, the high resolution reference image may be successfully used in a normalized gray scale pattern find process.

2. The system according to claim 1, wherein the reference image data module acquires an input image and selects an area around a reference item to generate the high resolution reference image.

3. The system according to claim 1, wherein the reference image rotation module rotates the high resolution reference image between 0° and a maximum amount of rotation in fixed increments of rotation.

4. The system according to claim 1, wherein the reference image rotation module rotates the high resolution reference image between +/−11° of rotation in fixed increments of rotation.

5. The system according to claim 4, wherein the fixed increments of rotation correspond to 1° increments of rotation.

6. The system according to claim 1, wherein the reference image test and user error module determines that a high resolution reference image is suitable for use as a reference image in the normalized gray scale pattern find process when the maximum NGC value between each rotated reference image and the high resolution reference image generated by the image cross correlation module is less than a predetermined threshold value.

7. The system according to claim 6, wherein the predetermined threshold value is a particular value depending upon an amount of rotation present in the rotated reference image.

8. The system according to claim 6, wherein the reference image test and user error module further determines the percentage of saturated pixels within the high resolution reference image.

9. The system according to claim 8, wherein the high resolution reference image is determined to be suitable for use as a reference image in the normalized gray scale pattern find process when the percentage of saturated pixels is less than a predetermined saturated pixel threshold.

10. The system according to claim 8, wherein the predetermined saturated pixel threshold exceeds 20 percent.

11. The system according to claim 1, wherein the system further comprises a reference image translation module for generating a set of translated reference images based upon the high resolution reference image;
   wherein the set of translated reference images are processes by the reference image test and error module to determine whether the high resolution reference image possesses sufficient translational content.

12. A method of performing rotational testing for a reference image used in a normalized gray scale pattern find system, the method comprising:
- generating a high resolution reference image;
- generating a set of rotated reference images from the high resolution reference image;
- cross-correlating the set of rotated reference images with the high resolution reference image to generate a set of cross-correlation values; and
- determining that the high resolution reference image is suitable for use in a normalized gray scale pattern find process when the maximum NGC value between each rotated reference image and the high resolution reference image generated by the image cross correlation module is less than a predetermined threshold value.

13. The method according to claim 12, wherein the predetermined threshold value is a particular value depending upon an amount of rotation present in the rotated reference image.

14. The method according to claim 12, wherein the method further comprises:
- determining that the high resolution reference image is suitable for use in a normalized gray scale pattern find process when the percentage of saturated pixels is less than a predetermined saturated pixel threshold.

15. The method according to claim 12, wherein the high resolution reference image is rotated between +/−11° of rotation in fixed increments of rotation to generate the set of rotated reference images.

16. The method according to claim 12, wherein the fixed increments of rotation correspond to 1° increments of rotation.

17. A computer data product readable by a computing system and encoding instructions for implementing a computer method of performing rotational testing for a reference image used in a normalized gray scale pattern find system, the method comprising:
- generating a high resolution reference image;
- generating a set of rotated reference images from the high resolution reference image;
- cross-correlating the set of rotated reference images with the high resolution reference image to generate a set of cross-correlation values; and
- determining that the high resolution reference image is suitable for use in a normalized gray scale pattern find process when the maximum NGC value between each rotated reference image and the high resolution reference image generated by the image cross correlation module is less than a predetermined threshold value.

18. The computer data product according to claim 17, wherein the predetermined threshold value is a particular value depending upon an amount of rotation present in the rotated reference image.

19. The computer data product according to claim 17, wherein the method further comprises:
- determining that the high resolution reference image is suitable for use in a normalized gray scale pattern find process when the percentage of saturated pixels is less than a predetermined saturated pixel threshold.

20. The computer data product according to claim 17, wherein the high resolution reference image is rotated between +/−11° of rotation in fixed increments of rotation to generate the set of rotated reference images.

21. The computer data product according to claim 17, wherein the fixed increments of rotation correspond to 1° increments of rotation.

* * * * *

UNITED STATES PATENT AND TRADEMARK OFFICE
CERTIFICATE OF CORRECTION

| | | |
|---|---|---|
| PATENT NO. | : 7,085,433 B2 | Page 1 of 1 |
| APPLICATION NO. | : 10/337518 | |
| DATED | : August 1, 2006 | |
| INVENTOR(S) | : Reiners | |

It is certified that error appears in the above-identified patent and that said Letters Patent is hereby corrected as shown below:

Col. 2, line 67: "manufactured oil an assembly" should read --manufactured on an assembly--

Col. 5, line 10: "con-elation." should read --correlation.--

Signed and Sealed this

Twenty-seventh Day of February, 2007

JON W. DUDAS
*Director of the United States Patent and Trademark Office*